US007181197B2

(12) United States Patent
Clayton

(10) Patent No.: US 7,181,197 B2
(45) Date of Patent: Feb. 20, 2007

(54) PREVENTING UNAUTHORIZED SWITCHING OF MOBILE TELECOMMUNICATIONS SERVICE PROVIDERS

(75) Inventor: Steve Clayton, Skillman, NJ (US)

(73) Assignee: Cingular Wireless II, LLC, Atlanta, GA (US)

( * ) Notice: Subject to any disclaimer, the term of this patent is extended or adjusted under 35 U.S.C. 154(b) by 205 days.

(21) Appl. No.: 10/690,468

(22) Filed: Oct. 20, 2003

(65) Prior Publication Data

US 2005/0085218 A1 Apr. 21, 2005

(51) Int. Cl.
*H04M 1/66* (2006.01)
(52) U.S. Cl. .................. 455/411; 455/551; 455/410; 455/412.2; 455/414.1
(58) Field of Classification Search ..... 455/410–412.2, 455/415, 428, 433, 445, 551, 414.1; 379/221.13, 379/93.01, 93.02
See application file for complete search history.

(56) References Cited

U.S. PATENT DOCUMENTS

| | | | | |
|---|---|---|---|---|
| 6,226,517 | B1 * | 5/2001 | Britt et al. | 455/445 |
| 6,505,051 | B1 * | 1/2003 | Alperovich et al. | 455/466 |
| 2003/0055723 | A1 * | 3/2003 | English | 705/14 |
| 2003/0219105 | A1 * | 11/2003 | Unger et al. | 379/88.16 |
| 2004/0024646 | A1 * | 2/2004 | Iry et al. | 705/26 |
| 2004/0053610 | A1 * | 3/2004 | Kim | 455/432.1 |
| 2004/0252821 | A1 * | 12/2004 | Chiczewski et al. | 379/207.11 |

OTHER PUBLICATIONS

Chinese Information and Networking Association (CINA), U.S. Local Number Portability (LNP): Overview, http://www.cina.org/nii9904_Inp_us/sld001.htm, presented Apr. 21, 1999, pp. 1-15.
Federal Communications Commission, First Memorandum Opinion and Order on reconsideration, in the matter of Telephone Number Portability, CC Docket No. 95-116, released Mar. 11, 1997.

* cited by examiner

*Primary Examiner*—Duc Nguyen
*Assistant Examiner*—Dai Phuong
(74) *Attorney, Agent, or Firm*—Woodcock Washburn LLP

(57) ABSTRACT

The present invention is directed to preventing unauthorized switching of mobile communications service providers in a system using portable phone numbers that follow the customer, even when the customer switches mobile communications service providers. A portable phone number as associated with a customer and with a first mobile communications service provider. A record of this association is stored in, for example, a data store that is accessible by multiple communications service providers within a mobile communications network. When a request for porting the portable phone number to a new service provider is received, the request is analyzed to determine whether the customer has authorized the requested port. If the customer has requested and authorized porting by providing, for example, a password or a response to an authorization request, a new association between the new mobile communications service provider and the portable phone number is stored in the data store.

38 Claims, 9 Drawing Sheets

PN = Portable Phone Number
RN = Routable Number

PREVENTING UNAUTHORIZED SWITCHING OF MOBILE TELECOMMUNICATIONS SERVICE PROVIDERS

TECHNICAL FIELD

The present invention is directed to the field of telecommunications and, more particularly, to security in the field of telephone number portability.

BACKGROUND

As the popularity of network communications increases, more and more communications service providers are offering their services to potential subscribers. A person wishing to purchase and use a wireless device (e.g., mobile phone, PDA, etc.) often is forced to choose among several service providers that offer various services and products. Once a subscriber selects a particular service provider, competitors may attempt to lure the subscriber away from her selected service provider by offering lower prices, more network time, free devices/features, etc. In the past, many subscribers balked at switching service providers because switching service providers also typically meant switching phone numbers, resulting in inconvenience to the subscriber.

However, with the advent of industry-wide number portability, subscribers of mobile communications services are allowed to retain a particular phone number while switching service providers and/or service regions. For example, a subscriber currently with Carrier A can keep her phone number even after switching to Carrier B's services.

Number portability is not free of problems, however. Because switching service providers becomes more or less invisible to the subscriber when the subscriber's phone number stays the same, there is an increased likelihood that unethical service providers or other unethical parties may attempt fraudulent and unauthorized switching, thereby harming unsuspecting subscribers.

Figure 1:
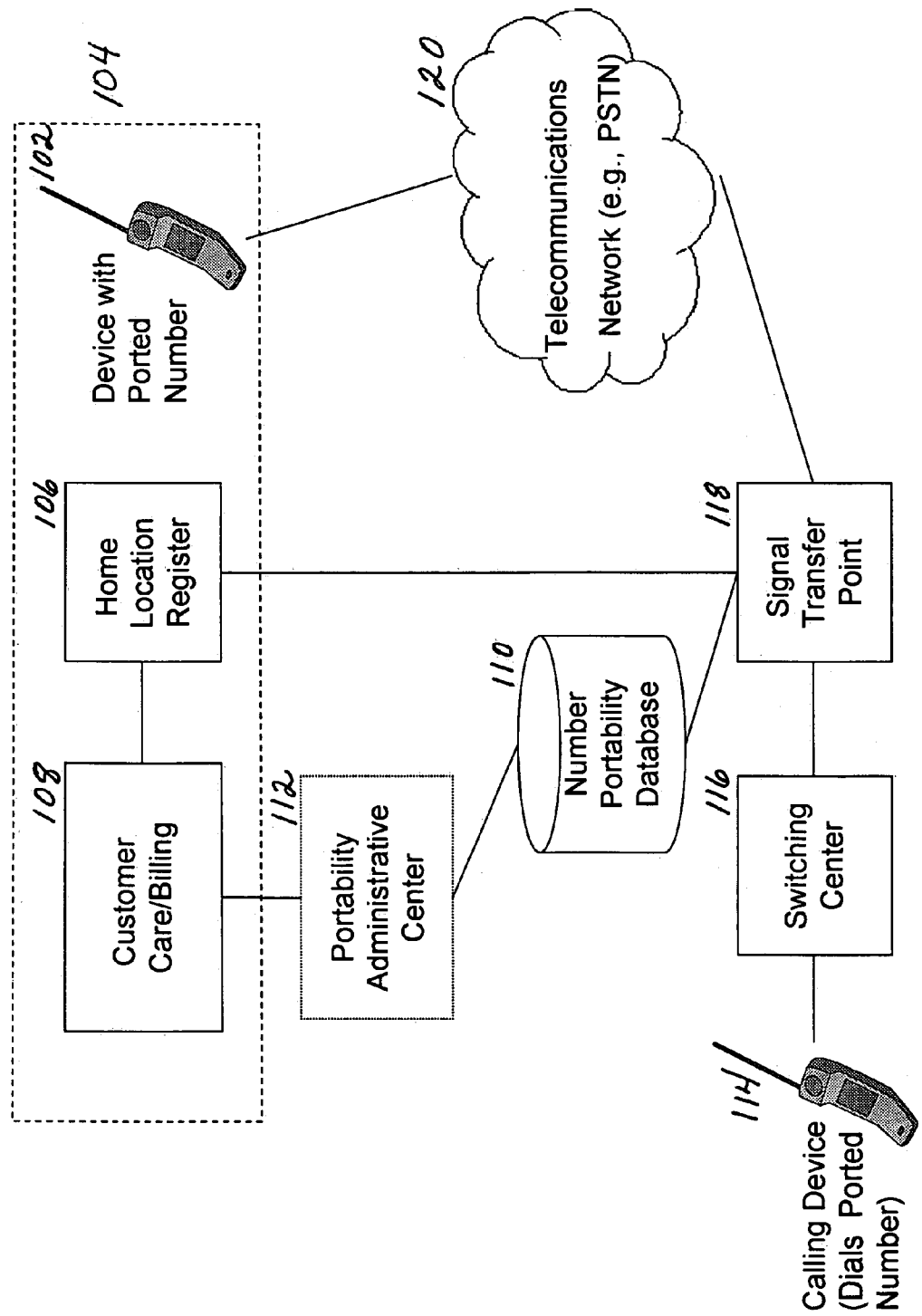
FIG. 1 is a block diagram of a suitable system for practicing embodiments of the invention, including preventing unauthorized switching of mobile telecommunications service providers.

The headings provided herein are for convenience only and do not necessarily affect the scope or meaning of the claimed invention.

In the drawings, the same reference numbers identify identical or substantially similar elements or acts. To easily identify the discussion of any particular element or act, the most significant digit or digits in a reference number refer to the figure number in which that element is first introduced (e.g., block 302 is first introduced and discussed with respect to FIG. 3).

DETAILED DESCRIPTION

Described in detail below are systems and associated methods for providing protection from unauthorized switching of mobile communications service providers in a communications network configured for number portability. The systems and associated methods provide a mobile customer, such as a mobile device user or an employer, parent, etc., of a mobile device user, with protection against having the portable phone number associated with an unauthorized service provider.

A portable phone number is one that can be enduringly associated with a particular mobile customer, even when that mobile customer switches mobile communications service providers. The process of switching service providers is sometimes called "porting." Using the techniques described herein, as well as similar techniques and variations, a customer is protected from unauthorized switching of service providers, even though the assigned portable phone number is otherwise easily switched or "ported" from one service provider to another.

In one embodiment of the invention, a portable phone number is linked to a selected service provider by associating the portable phone number with a second number, such as a network routing number or a device identification number (herein generally referred to as a "routable number"), which is unique to and compatible with the selected service provider's network. In this way, when a call is made by dialing the portable phone number, the portable phone number can be used to identify the routable number, which can then be used to route the call to the appropriate device.

At least one data store, accessible by multiple communications service providers, may be used to store the association between the phone number and the routable number. When a call is made, the routable number can be looked up in the data store at a switching point. When the customer wants to change service providers but keep the same phone number, the data store is modified so that the customer's portable phone number is associated with a new routable number that is compatible with a new service provider's network.

Because the porting process is relatively simple and is invisible to the customer, portable phone numbers are prone to misuse by unethical parties hoping to profit by switching a customer's service provider without the customer's knowledge. To prevent unauthorized switching of service providers, the disclosed system and method permits various techniques to prevent altering the association between a portable phone number and a routable number without the customer's authorization. Some of these techniques rely on limiting writable access to the data store that stores the association between phone number and routable number. For example, a third party administrator may exclusively control writable access to the data store. In such a case, the third party will revise the association between the portable phone number and the routable number only when given the proper assurance that the customer, either directly or indirectly, has authorized the change.

In another example, a current service provider may be given limited writable access to a shared data store, but only with respect to the portions of the data store pertaining to its own customers or any new customers that have not yet been assigned a portable phone number. Then, when provided with acceptable customer authorization, the current service provider can revise the information in the data store so the customer's portable phone number is associated with a new routable number that is compatible with and unique to the network of a newly selected service provider. Alternatively, the current service provider can transfer writable access permission from itself to the newly selected service provider, so the newly selected service provider can modify the data store as necessary to complete the switch.

In the case where a password (or similar authorization information) is used for authorization, either the current service provider or a third party administrator stores an association between a customer and that customer's password. In this way, a request for switching the customer's service provider can be authorized by receiving the password and verifying that it is associated with the relevant customer. In addition to passwords, other authorization information, such as biometrics, voice signatures, etc., may be used.

In an alternative technique that does not involve passwords or similar authorization techniques such as those described above, authorization may be based on the occurrence of some event. For example, a customer can authorize a switch by replying to a voice- or text-message sent to her on her mobile communications device. In another example, a customer can authorize a switch by dialing into a special number using her mobile communications device. In yet another example, a new service request placed electronically by a customer may be logged in a system configured to provide automated authorization information to the necessary parties/systems.

The invention will now be described with respect to various embodiments. The following description provides specific details for a thorough understanding of, and enabling description for, these embodiments of the invention. However, one skilled in the art Will understand that the invention may be practiced without these details. In other instances, well-known structures and functions have not been shown or described in detail to avoid unnecessarily obscuring the description of the embodiments of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. Representative System

FIG. 1 is a block diagram of a suitable system for practicing embodiments of the invention, including preventing unauthorized switching of mobile telecommunications service providers. For clarity, portions of the system that are well known in the art, such as various base stations and switches, etc., are not shown in FIG. 1.

The system includes a device 102, such as a mobile phone, PDA, etc., having a portable number (e.g., MIN, MSISDN, etc.). The device 102 is associated with a selected service provider subsystem 104, including a home location register 106 and a customer care/billing center 108. The customer care/billing center 108 has access to a number portability database 110, either directly or through a portability administrative center 112. The number portability database 110 stores an association between the portable number associated with the device 102 and a routable number (e.g., MDN, SIM, ICCID, IMSI, etc.), such as a mobile identification number or routing number that is unique to and compatible with the selected service provider subsystem 104.

Various parties may have permission to update the database. If the service provider 104 has only indirect access for writing to the number portability database 110, changes to the database are made via requests to the portability administrative center 112. If, however, the service provider 104 has direct access to write to the number portability database 110, changes may be made directly by, for example, an administrator at the customer care billing center 108. However, such directed writable access may be limited (e.g., the service provider system may only be able to write to the database with respect to its own customers).

In some embodiments, the number portability database 110 is shared between multiple service providers, meaning it (1) stores customer information for multiple service providers and (2) is accessible by system components of multiple service providers so it can be used to route calls made to ported numbers regardless of service provider. For example, a calling device 114 can place a call to the device 102 by dialing the portable phone number. The call is routed through a switching center 116 to a signal transfer point 118, where the number portability database 110 is checked for information about the portable number, including the associated routable number. Once the routable number associated with the portable phone number is identified, the home location register 106 associated with the device 102 can be checked for further information about the location of the device 102. When the necessary information is known, the call can be routed to the device 102 via a telecommunications network 120, such as a public switched telephone network, packet switched network, combination/hybrid network, etc.

II. Representative Flows

Figure 2:
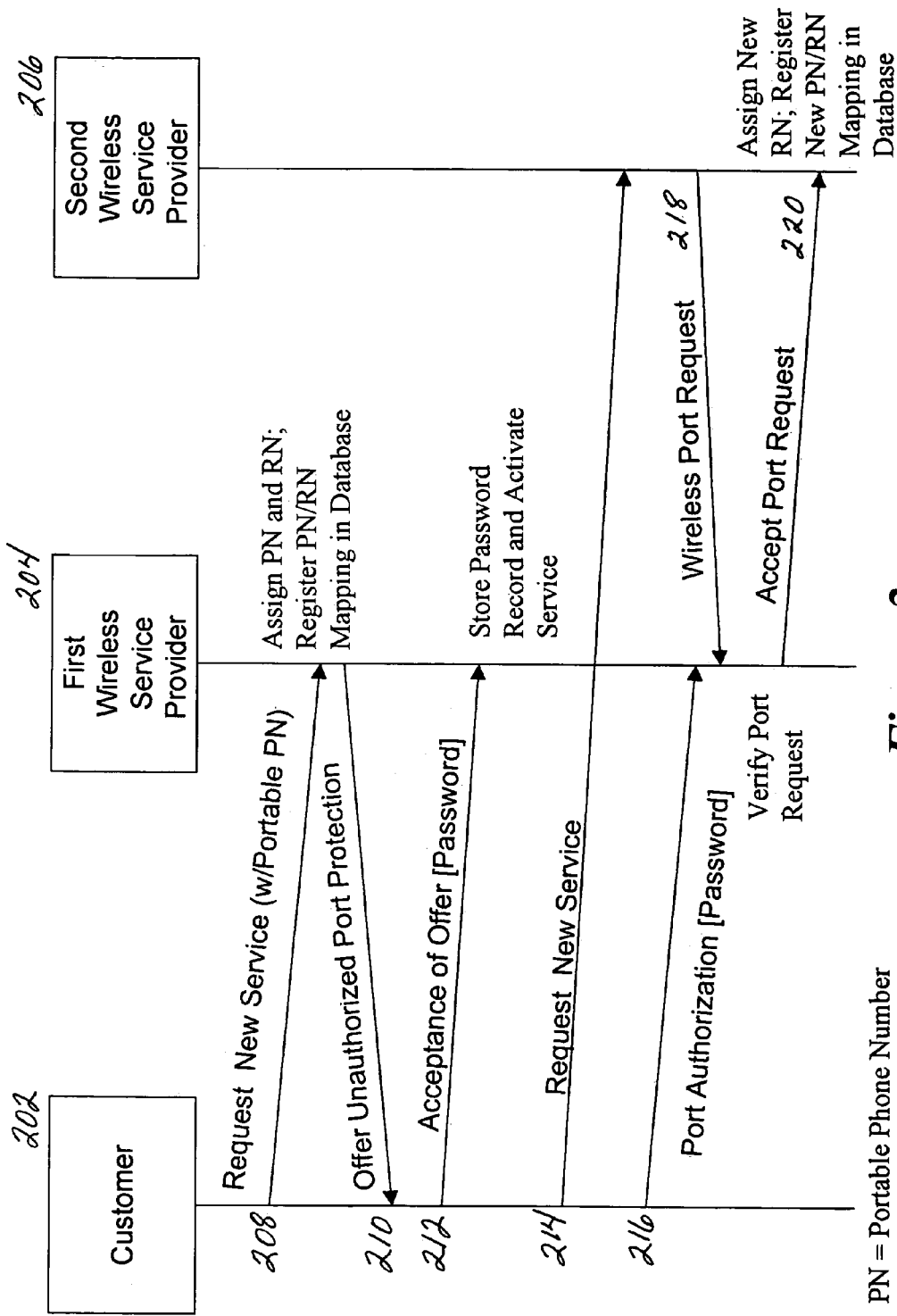
FIG. 2 is a flow diagram showing an example of communication data between a mobile customer and first and second mobile communications service providers.
Figure 3:
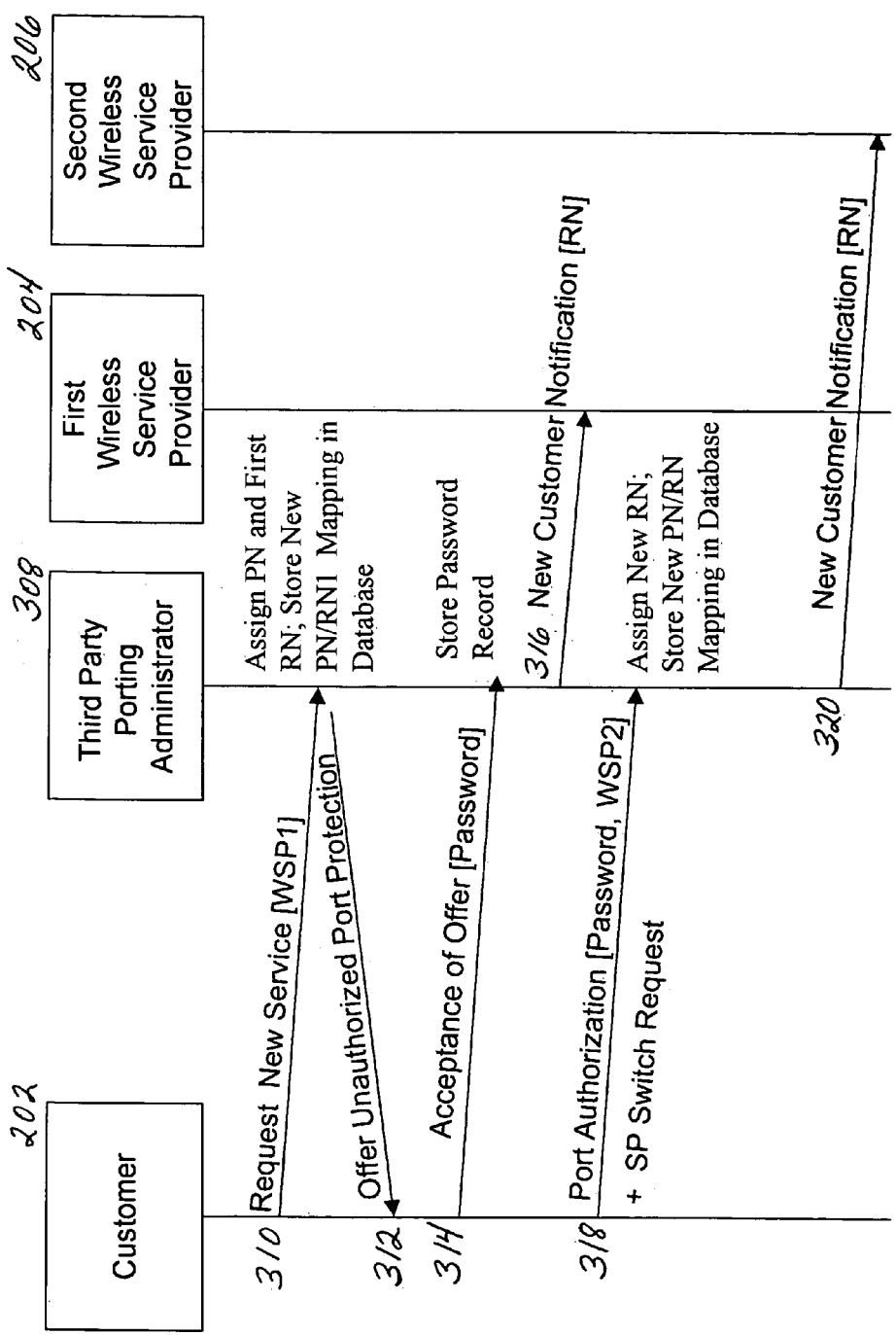
FIG. 3 is a flow diagram showing an example of communication data between a mobile customer, a third party porting administrator, and first and second mobile communications service providers.

Referring to FIGS. 2 and 3, representative message or data flow diagrams depict exchanges of communications between a customer desiring service for one or more mobile devices, a first service provider subsystem, a second service provider subsystem, and (optionally) a third party portability administrator, such as the portability administrative center 112 of FIG. 1. These and other flow diagrams do not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented.

FIG. 2 is a flow diagram showing an example of communication data between a mobile customer 202, a first wireless service provider 204, and a second wireless service provider 206. In communication 208, the customer 202 requests new service from the first service provider 204. Based on this request, the first service provider 204 assigns a portable phone number and a routable number to the customer 202. The portable phone number is unique to the customer 202 and is the number that callers will dial when they want to call the customer's mobile device. The routable number is compatible with and unique to the communication network of the first service provider 204 and, in some cases, may be unique to the wireless device of the customer.

Once the portable phone number and the routable number are assigned to the customer 202, the first service provider 204 registers a mapping between the portable phone number and the routable number in a portable number database, such as the number portability database 110 of FIG. 1, that is accessible by multiple communications service providers within a communications network. In communication 210, the first service provider 204 offers unauthorized port protection to the customer 202 to protect the customer 202 from having the service provider switched without the customer's authorization. In communication 212, the customer 202 accepts the offer for unauthorized port protection. Because some embodiments rely on passwords for authorization processes, acceptance of the offer for unauthorized port protection may involve the customer 202 providing a password that can be used to authorize a port request when switching of service providers is desired. The first service provider 204 then stores a record of this password in association with the customer 202 and activates service so the customer 202 can then proceed with use of the mobile device without having to worry about an unauthorized switching of service provider.

In communication 214, the user has decided to switch service providers but retain the same portable phone number and sends a request for new service to the second service provider 206. In communication 216, the customer 202 authorizes porting of the portable phone number by providing a password to the first wireless service provider 204 indicating that the port is authorized. Alternatively, this password may be provided to the first service provider 204 indirectly. For example, the customer 202 may provide the password to the second service provider 206 who then passes it on to the first service provider 204 as part of a port request.

After receiving the request for new service from the customer 202 (communication 214), the second service provider 206, in communication 218, sends a wireless port request to the first service provider 204 so the customer 202 can switch from the first service provider 204 to the second service provider 206. After receiving the port authorization of communication 216, the first service provider 204 verifies the port request and sends an accept port request communication 220 to the second service provider 206. The second service provider 206 then assigns to the customer's 202 device a new routable number that is compatible with and unique to the second service provider's 206 network. This new routable number will then be mapped to the customer's 202 portable phone number and registered in the number portability database, such as the database 110 of FIG. 1. The customer 202 can then request unauthorized port protection via the second wireless provider 206.

FIG. 3 is a flow diagram showing an example of communication data between a mobile customer 202, a first wireless service provider 204, a second wireless service provider 206, and a third party porting administrator 308. In this example, the third party porting administrator 308 handles database information that includes mapping between a, customer's portable phone number and the customer's current routable number.

In communication 310 the customer 202 requests a subscription for service from the first wireless service provider 204. In some embodiments, as shown in FIG. 3, this request is handled by the third party porting administrator 308 on behalf of the first service provider 204. Based on this request, the third party porting administrator 308 assigns a portable phone number and a routable number compatible with and unique to the first service provider's 204 network. To ensure that the assigned identification number is compatible with and unique to the first service provider's 204 network, the third party porting administrator 304 may need to identify a suitable routable number by requesting one from the first service provider 204 or, alternatively, identify a number from an available number database. Once the portable phone number and the routable number are assigned, the third party porting administrator 308 stores the portable phone number and the routable number in a database that is accessible by multiple wireless providers. Information relating to the association between the two numbers is also stored in the database, sometimes called a "mapping."

In communication 312, the third party porting administrator 308 offers unauthorized port protection to the customer 202. In communication 314 the customer 202 accepts the offer for unauthorized port protection and, if the authorization technique utilizes a password, provides a password to the third party porting administrator 308. The third party porting administrator 308 stores a password record in association with the customer 202 so the customer 202 can later authorize switching of wireless service providers using the password. As an alternative to password authorization, other authorization techniques, such as a response to a notification message or a call to a designated authorization number, may be utilized.

In communication 316 the third party porting administrator 308 sends a notification to the first service provider 204 that the portable phone number and routable number have been assigned to the customer 202. Accordingly, the first service provider 204 can begin offering service to the customer 202. Based on this service, the customer 202 can be called using the portable phone number.

In communication 318 the customer 202, wishing to switch service providers, provides a port authorization and service switch request to the third party porting administrator 308. In an alternate embodiment (not shown), the customer 202 may request service from the second service provider 206, who then provides a request to the third party porting administrator 308. Based on the switch service request, the third party porting administrator 308 assigns a new routable number that is compatible with and unique to the second wireless service provider's 206 network. The customer 202 keeps the original portable phone number. The third party porting administrator 308 then stores the new portable phone number/identification number combination in its database. In communication 320 the third party porting administrator 308 sends a registration complete message to the second service provider 206 and the first service provider 204, so the appropriate services can be terminated and initiated.

In some embodiments, notifications 316 and 320 may be conditional and based on acceptance by the selected service provider. In this way, the service provider can, for example, check the customer's credit history, etc. In an alternate embodiment, new service requests, such as those of communications 310 and 318, may be provided by the respective service providers rather than by the customers. Additionally, passwords and other authorization information may be provided to the third party porting administrator 308 indirectly, via the wireless service providers 204 and 206.

Referring to FIGS. 4 through 9, some functionality performed by the system of one embodiment of the present invention is shown as one or more routines. These routines may be hardware-based, embodied in software in a computer-readable medium, or any combination of the two.

Figure 4:
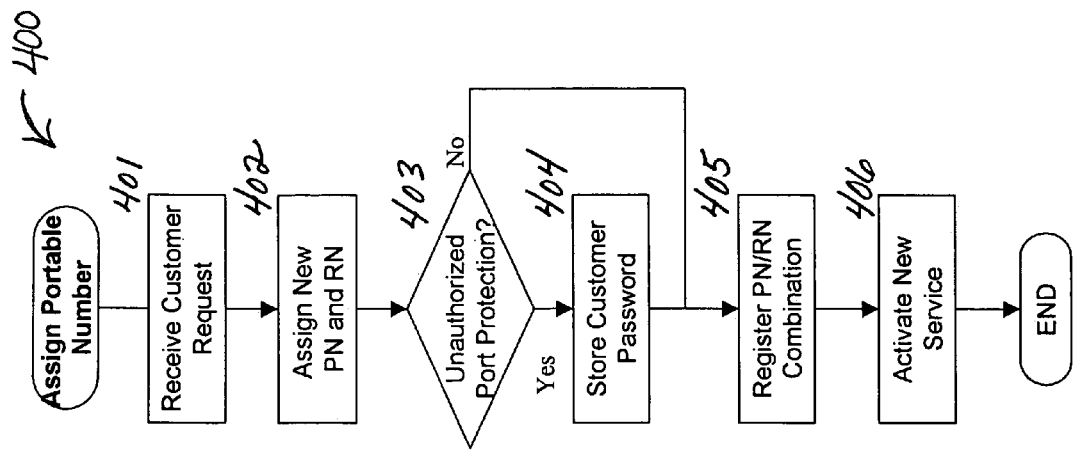
FIG. 4 is a flow diagram of an example routine for setting up a user account with a new portable phone number and unauthorized port protection.

FIG. 4 is a flow diagram 400 of an example routine for setting up a customer account subscription for a new portable mobile phone number, including unauthorized port protection. This routine can be performed, for example, at a communications service provider or, alternatively, at a third party portable administration center, such as the portability administration center 112 of FIG. 1. In block 401, the routine receives a customer request for new mobile phone service. In block 402, the routine assigns a new portable phone number and a routable number to the customer (having one or more devices). In decision block 403, the routine determines whether the customer desires unauthorized port protection by querying the customer. If the routine determines that the customer does not desire unauthorized port protection, the routine continues at block 405. However, if the routine determines that the customer desires unauthorized port protection, the routine continues at block 404, where the routine stores a customer password for the customer account so future modifications of service providers can be authorized when appropriate. In block 405, the routine continues by registering the portable phone number and routable number combination in, for example, a database accessible by multiple service providers. In block 406, the routine takes steps to initiate activation of the new service. The routine then ends after block 406.

Figure 5:
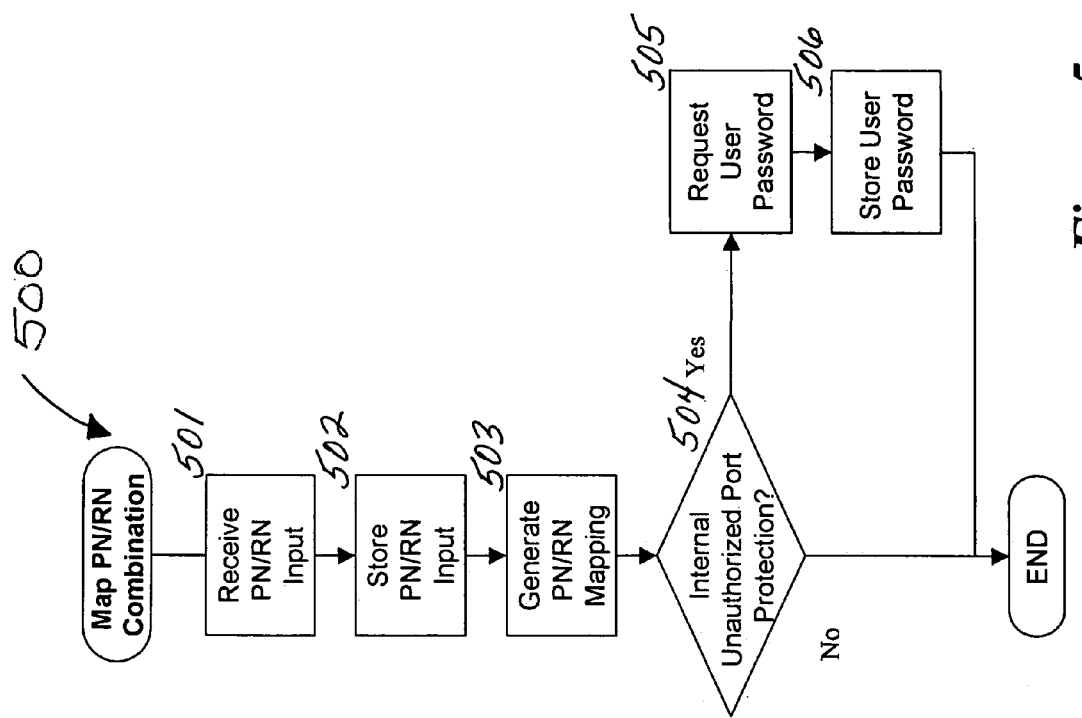
FIG. 5 is a flow diagram of an example routine for associating a portable phone number with an interchangeable routable number and a user password for implementing unauthorized port protection.

FIG. 5 is a flow diagram 500 of an example data store routine for associating a portable mobile phone number with an interchangeable routable number and a user password for implementing unauthorized port protection. In block 501, the data store routine receives a portable number input and a routable number input for a customer. In block 502, the data store routine stores the portable number/routable number combination. In block 503, the routine generates a pointer from the portable number to the identification number so that a mapping exists between the two data entries. In decision block 504, if the routine is to handle unauthorized port protection, the routine continues at block 505. Otherwise the routine ends. In block 505, the routine requests user password information. In block 506 the routine stores the user password information and generates a mapping between the user password and the previously stored portable phone number/routable number combination. The routine then ends.

Figure 6:
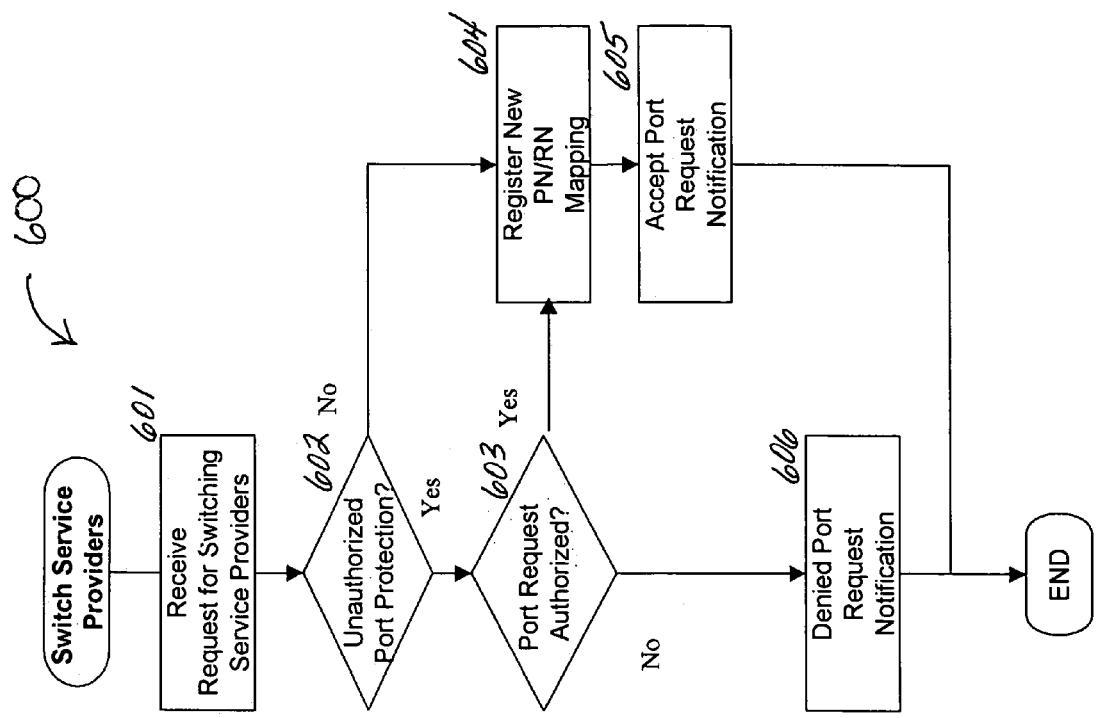
FIG. 6 is a flow diagram of an example routine for switching mobile communications service providers given an existing portable phone number that is protected from unauthorized porting.

FIG. 6 is a flow diagram 600 of an example routine for switching mobile communication service providers given an existing portable mobile phone number that is protected from unauthorized porting. As with the routine of FIG. 4, this routine can take place at the service provider or, alternatively, at a third party number portability administrator computer. In block 601, the routine receives a request to switch service providers for a designated customer. This request may be received from a service provider contacted by the customer or, in some cases, directly from the customer. In decision block 602, the routine checks to see whether unauthorized port protection is activated for the customer. If unauthorized port protection has been activated, the routine continues at block 603. If, however, the customer has not activated unauthorized port protection, the routine skips to block 604. In decision block 603, the routine seeks customer authorization for the service provider switch. For example, the customer may have already provided a password to a system accessible by the routine. Alternatively, a message may be sent to the customer on his or her mobile device requesting authorization of the switch. If customer authorization has been received, the routine continues at block 604. Otherwise, the routine continues at block 606 where the routine generates a denied port request notification and then ends. If, however, the correct customer authorization is received, the routine continues at block 604 where the routine registers a new mapping between the customer's permanent portable phone number and a routable number compatible with the new service provider's telephone network. In block 605, the routine generates an accept port request notification. Also in block 605, the routine may take steps to initiate cancellation of the old service and/or activation of the new service. The routine then ends.

Figure 7:
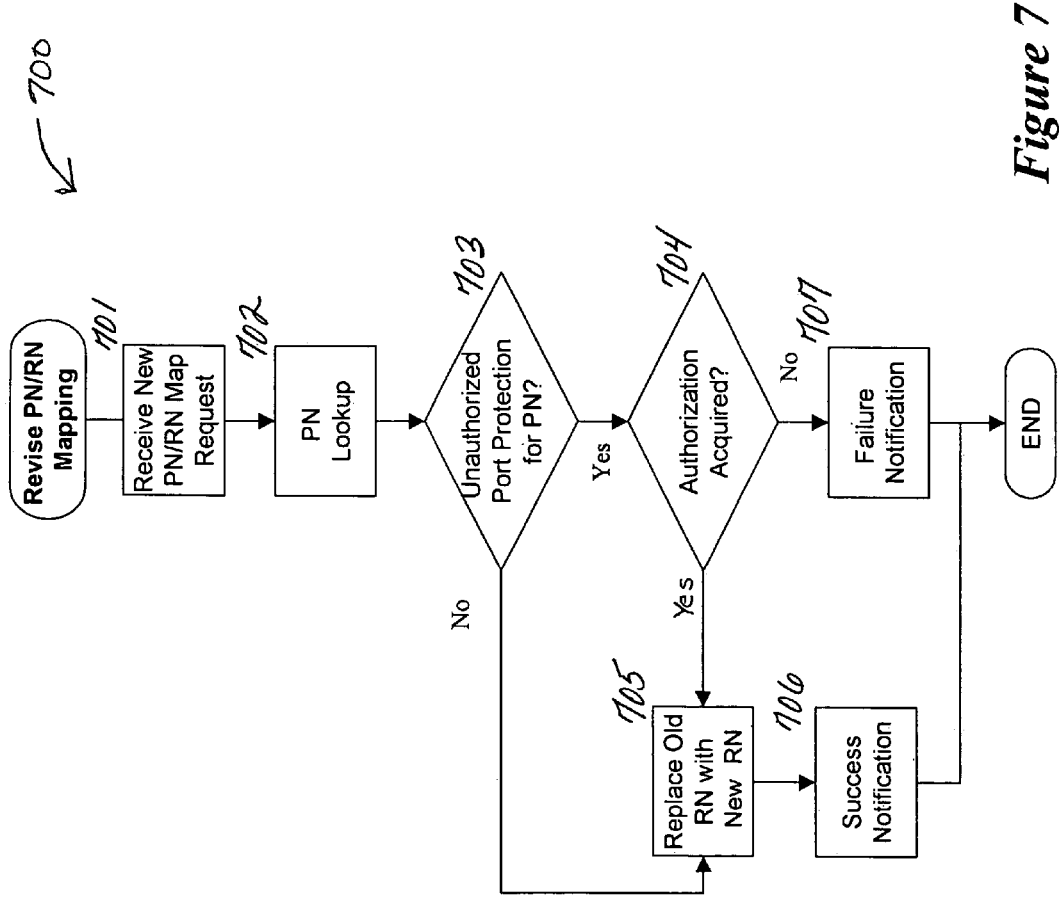
FIG. 7 is a flow diagram of an example routine for associating a portable phone number with a new interchangeable routable number when the portable phone number is protected from unauthorized porting in accordance with one embodiment of the invention.

FIG. 7 is a flow diagram 700 of an example routine 700 for associating an already assigned portable phone number with a new interchangeable routable number when the portable phone number is protected from unauthorized porting in accordance with one embodiment of the invention.

In block 701, the routine receives a new mapping request based on an already assigned portable phone number/routable number combination. In block 702, the routine looks up the portable number in the data store. In decision block 703, the routine checks if the customer has requested internal port protection. If, in decision block 703, internal port protection is in place, the routine continues at decision block 704. If internal port protection is not in place, the routine continues at block 705 where the routine stores the new routable number and replaces the mapping between the portable number and the old routable number with a mapping between the portable number and the new routable number. Once this occurs, the routine performs a port success notification in block 706 and then ends. In decision block 704, the routine checks if the port has been authorized. If the port has been authorized, the routine continues at blocks 705 and 706, as discussed above: If, however, the port has not been authorized, the routine continues at block 707 where the routine performs a port failure notification before ending.

Figure 8:
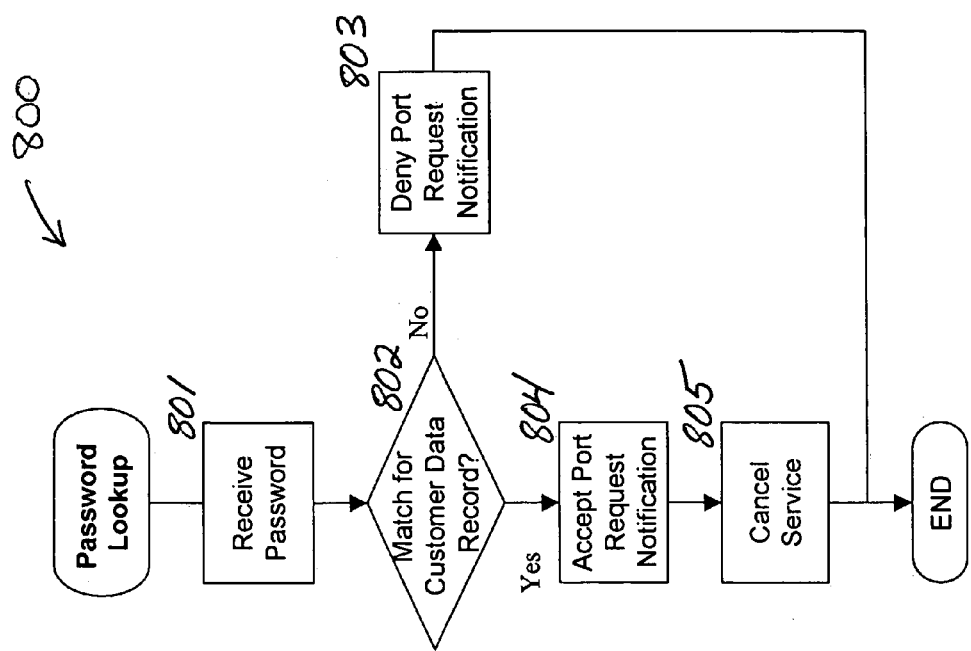
FIG. 8 is a flow diagram of an example routine for authorizing a port request for a portable phone number that is protected from unauthorized porting.

FIG. 8 is a flow diagram 800 of an example routine for authorizing a port request for a portable phone number that is protected from unauthorized porting using a password system. In this example, the routine is performed at the old service provider. In block 801, the routine receives a password for a port request. This password can be obtained directly from the customer or from a new service provider who received the password from the customer. In decision block 802, the routine checks if the password matches the password stored in the customer data record. If, there is no match for the password in the customer data record, the routine continues at block 803 where a deny port request notification is generated and sent to the requesting party before the routine ends. Otherwise, if there is a match with the password in the customer data record, the routine continues at block 804 where the routine generates and sends an accept port notification to the requesting party. At block 805, the routine then cancels the existing service of the user.

With the example routine of FIG. 8, it is the new service provider's responsibility to update the mapping between the portable phone number of the customer and a new routable number that is compatible with the new service provider's system. The new service provider may do so by contacting a third party portable number administrator and providing the accept port request notification produced by the routine of FIG. 8. The third party administrator may then perform a routine for mapping the portable number with the new compatible routable number in the number portability database. An example of such a routine is shown in FIG. 6. Alternatively, the authorized port request routine of FIG. 6 may include transferring permission to write to a portability number database from the old service provider to the new service provider.

Figure 9:
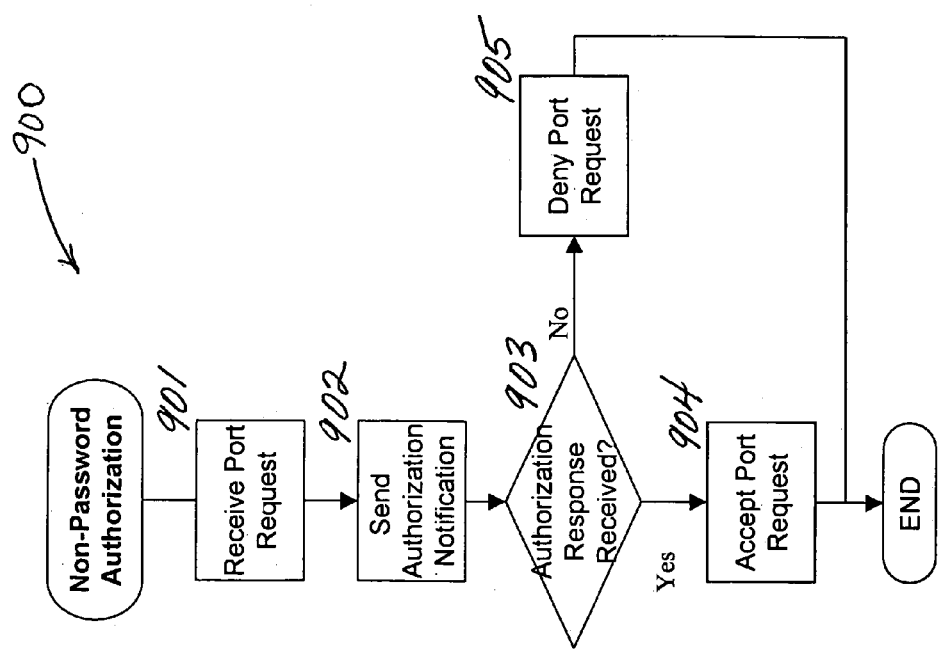
FIG. 9 is a flow diagram of an example routine for obtaining authorization from a customer wishing to switch service providers when unauthorized port protection is in place.

FIG. 9 is a flow diagram 900 of an example routine for obtaining authorization from a customer wishing to switch service providers when unauthorized port protection in place. The routine may be performed in a wireless service provider system or at a third party administrator system. In block 901, the routine receives a port request from a potential new service provider. In block 902, the routine requests customer authorization by, for example, sending a request port authorization message (e.g., text message, voicemail, email, etc.) to the customer or placing an automated call to the customer. In decision block 903, if the routine receives authorization from the customer (e.g., receipt of a response to the sent authorization request message), the routine continues at block 904 where the routine returns an accept port request and ends. If, however, the customer does not authorize the port within, for example, a given time period, the routine returns a deny port request, as shown in block 905. The routine then ends.

A variation of some of the authorization techniques described above includes allowing the customer to switch service providers using, for example, an online form via the Internet. Provided that the authenticity of the online form can be verified, the party or system seeking customer authorization for a port request can use an indication of the verified online form as authorization for the switch. In this way, the customer does not have to take further steps in order to authorize such a switch.

Unless the context clearly requires otherwise, throughout the description and the claims the words "comprise," "comprising," and the like are to be construed in an inclusive sense, as opposed to an exclusive or exhaustive sense, and can be interpreted as "including, but not limited to." Words using the singular or plural number also include the plural or singular number, respectively. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the wireless telephone system described in detail herein. These and other changes can be made to the invention in light of the detailed description. Moreover, the elements and acts of the various embodiments described above can be combined to provide further embodiments.

In general, the terms used in the following claims should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium (e.g., RAM or ROM memory, CD-ROM, DVD, hard drive, etc.), other aspects may likewise be embodied in a computer-readable medium. Accordingly, the inventors reserve the right to add additional claims after filing the application to pursue such additional claim forms for other aspects of the invention.

I claim:

1. A mobile communications system in a mobile communications network configured for portability of mobile phone numbers, the system comprising:
    at least one data store for storing information identifying a mapping between a customer's portable phone number and a unique routable number, wherein the routable number allows calls made to the customer using the portable phone number to be routed to a portion of the mobile communications network associated with a mobile communications service provider;
    an administration subsystem for facilitating the storage of information in the data store; and
    a customer data subsystem for storing customer data records, wherein the customer data records include authorization information associated with a request by the customer to prevent unauthorized porting of the portable phone number, wherein the unauthorized porting comprises
        creating a mapping between an unauthorized mobile communications service provider and the portable phone number, and
        storing the mapping in the data store,
        wherein creating the mapping between the unauthorized mobile communications service provider and the portable phone number includes associating the portable phone number with a routing number unique to the unauthorized mobile communications service provider so that calls made to the customer using the assigned portable phone number are routed to portions of the mobile communications network associated with the unauthorized mobile communications service provider.

2. The system of claim 1, wherein the request for unauthorized porting prevents mapping of the portable phone number to a routable number associated with an unauthorized mobile communications service provider.

3. The system of claim 1, wherein the data store is readable by multiple mobile communications service providers within the communications network.

4. The system of claim 1, mobile communications service provider has permission to write to the data store.

5. The system of claim 1, wherein the administration subsystem has exclusive permission to write to the data store.

6. The system of claim 1, wherein the at least one data store comprises multiple regional data stores.

7. In a communications system including a mobile communications network configured to allow portability of mobile phone numbers, a method for preventing unauthorized switching of mobile communications service providers, the method comprising:

associating a portable phone number with a customer and with a first mobile communications service provider;

storing a record of the association between the portable phone number and the first mobile communications service provider in at least one data store that is accessible by multiple communications service providers within the mobile communications network;

receiving a request for porting the portable phone number, wherein the porting includes associating a second mobile communications service provider with the assigned portable phone number;

based on the request, analyzing a customer data record to determine whether the customer has authorized the requested porting by providing authorization information known by the customer, wherein the analyzing prevents unauthorized porting, and wherein the unauthorized porting comprises:

creating a mapping between an unauthorized mobile communications service provider and the portable phone number and storing the mapping in the data store, wherein creating the mapping between the unauthorized mobile communications service provider and the portable phone number includes associating the portable phone number with a routing number unique to the unauthorized mobile communications service provider so that calls made to the customer using the assigned portable phone number are routed to portions of the mobile communications network associated with the unauthorized mobile communications service provider; and if the customer has authorized the requested porting, storing in the at least one data store a record of a new association between the second mobile communications service provider and the portable phone number, wherein the record of the new association between the second mobile communications service provider and the portable phone number includes an association between the portable phone number and a routing number unique to the second mobile communications service provider, and wherein the routing number allows calls made to the customer using the assigned portable phone number to be routed to portions of the mobile communications network associated with the second mobile communications service provider.

8. The method of claim 7, wherein the assigned portable phone number is associated with the first mobile communications service provider using a first identifier unique to the first mobile communications service provider, and wherein the assigned portable phone number is associated with the second mobile communications service provider using a second identifier unique to the second mobile communications service provider.

9. The method of claim 7, wherein the assigned portable phone number is associated with the first mobile communications service provider using a routing number unique to the first mobile communications service provider, and wherein the routing number allows calls made to the customer using the assigned portable phone number to be routed to portions of the mobile communications network associated with the first mobile communications service provider.

10. The method of claim 7, wherein a third party administrator has permission to write to the at least one data store used to the store the record of the association between the assigned portable phone number and the first mobile communications service provider.

11. The method of claim 7, wherein the at least one mobile communications service provider has permission to write to the at least one data store used to the store the record of the association between the assigned portable phone number and the first mobile communications service provider.

12. The method of claim 7, wherein the customer provides the password to the second mobile communications service provider, and wherein the request for porting includes the password.

13. The method of claim 7, wherein the request for porting does not include the password, and wherein the customer provides the password to the first mobile communications service provider prior to the analyzing of the request.

14. In a communications system including a mobile communications network configured to allow portability of mobile phone numbers, a method for preventing unauthorized switching of mobile communications service providers, the method comprising:

receiving a request to prevent unauthorized porting of a portable phone number assigned to a customer, wherein the unauthorized porting comprises creating an association between an unauthorized mobile communications service provider and the assigned portable phone number, including associating the portable phone number with a routing number unique to the unauthorized mobile communications service provider so that calls made to the customer using the assigned portable phone number are routed to portions of the mobile communications network associated with the unauthorized mobile communications service provider, wherein an indication of the association of the portable phone number with the routing number is stored in at least one data store for storing information identifying a mapping between a customer's portable phone number and a unique routable number, wherein the routable number allows calls made to the customer using the portable phone number to be routed to a portion of the mobile communications network associated with a mobile communications service provider, and wherein the at least one data store comprises a single network-wide data store;

storing a record of the request to prevent unauthorized porting of the assigned portable phone number; and storing customer authorization information associated with authorizing porting of the assigned portable phone number.

15. The method of claim 14, wherein the customer authorization information associated with authorizing porting of the portable phone number includes a password, and wherein the password is later provided before the completion of a porting request.

16. The method of claim 14, wherein a third party database administrator receives the request to prevent unauthorized porting.

17. The method of claim 14, wherein an authorized communications service provider receives the request to prevent unauthorized porting.

18. In a communications system including a mobile communications network configured to allow portability of mobile phone numbers, a method for preventing unauthorized switching of mobile communications service providers, the method comprising:

associating a first routable number with a portable phone number, wherein the portable phone number is assigned to a customer, and wherein the first routable number allows calls made to the customer using the portable phone number to be routed to portions of the mobile communications network associated with a first mobile communications service provider;

receiving from a second mobile communications service provider a request for porting the portable phone number, wherein the porting includes associating a new routable number with the portable phone number, and wherein the new routable number allows calls made to the customer using the portable phone number to be routed to portions of the mobile communications network associated with the second mobile communications service provider; and based on the request for porting, sending a message to the customer, wherein the message requests that the customer provide authorization for the request for porting so that unauthorized porting can be prevented, wherein the unauthorized porting comprises creating a mapping between an unauthorized mobile communications service provider and the portable phone number and storing the mapping in the data store, wherein creating the mapping between the unauthorized mobile communications service provider and the portable phone number includes associating the portable phone number with a routing number unique to the unauthorized mobile communications service provider so that calls made to the customer using the assigned portable phone number are routed to portions of the mobile communications network associated with the unauthorized mobile communications service provider.

19. The method of claim 18, wherein the first routable number and the new routable number are mobile station identifiers (MSID) that are also specific to a mobile device owned by the customer.

20. The method of claim 18, wherein the message sent to the customer is a voicemail message that the customer receives on a device associated with the assigned portable number.

21. The method of claim 18, wherein the message sent to the customer is a text message that the customer receives on a device associated with the assigned portable number.

22. The method of claim 18, wherein the message sent to the customer is an email message.

23. The method of claim 18, wherein the message requests the customer to provide authorization by dialing a number listed in the message.

24. The method of claim 18, wherein the message requests the customer to provide authorization by sending a text message.

25. The method of claim 18, wherein the customer is an employer of a user of a mobile device associated with the portable phone number.

26. A mobile communications system in a mobile communications network configured for portability of mobile phone numbers, the system comprising:

means for associating a portable phone number with a first mobile communications service provider;

means for storing a record of the association between the portable phone number and a mobile communications service provider in at least one data store so that information about the association is accessible by multiple communications service providers within the mobile communications network;

means for receiving from a second mobile communications service provider a request for porting the portable phone number, wherein the porting includes associating a second mobile communications service provider with the assigned portable phone number wherein associating the second mobile communications service provider with the assigned portable phone number includes associating the portable phone number with a routing number unique to the second mobile communications service provider, and wherein the routing number allows calls made to the customer using the assigned portable phone number to be routed to portions of the mobile communications network associated with the second mobile communications service provider; and means for analyzing a customer database to determine whether the customer has authorized the requested porting, wherein the means for analyzing prevents unauthorized porting, and wherein the unauthorized porting comprises:

creating a mapping between an unauthorized mobile communications service provider and the portable phone number and storing the mapping in the data store, wherein creating the mapping between the unauthorized mobile communications service provider and the portable phone number includes associating the portable phone number with a routing number unique to the unauthorized mobile communications service provider so that calls made to the customer using the assigned portable phone number are routed to portions of the mobile communications network associated with the unauthorized mobile communications service provider.

27. A method for preventing unauthorized switching of mobile communications service providers, the method comprising:

receiving at a mobile communication device, an indication of a portable phone number associated with a first mobile service provider for use when calling the mobile communication device; and receiving from a mobile communications service provider or a third party administrator, a notification of an option to prevent unauthorized switching of the first mobile service provider to a second mobile service provider, wherein the source has at least partial control of the switching, and wherein the wherein the unauthorized switching comprises creating an association between an unauthorized mobile communications service provider and the assigned portable phone number and storing the association in a data store, wherein creating the association between the unauthorized mobile communications service provider and the portable phone number includes associating the portable phone number with a routing number unique to the unauthorized mobile communications service provider so that calls made to the customer using the assigned portable phone number are routed to portions of the mobile communications network associated with the unauthorized mobile communications service provider; and based on the received notification, providing authorization information for storage at the mobile communications service provider or third party administrator, wherein the authorization information can later be provided by the customer to authorize a switch from the first mobile communications service provider to a second mobile communications service provider.

28. A computer-readable medium whose contents cause a computing device to prevent unauthorized switching of mobile communications service providers, by performing a method comprising:

associating a first routable number with a portable phone number, wherein the portable phone number is assigned to a customer, and wherein the first routable number allows calls made to the customer using the portable phone number to be routed to portions of the mobile communications network associated with a first mobile communications service provider;

receiving from a second mobile communications service provider a request for porting the portable phone number, wherein the porting includes associating a new routable number with the portable phone number, and wherein the new routable number allows calls made to the customer using the portable phone number to be routed to portions of the mobile communications network associated with the second mobile communications service provider;

based on the request for porting, determining whether the customer has requested protection from unauthorized porting, wherein the unauthorized porting comprises creating an association between an unauthorized mobile communications service provider and the assigned portable phone number and storing the association in a data store, wherein creating the association between the unauthorized mobile communications service provider and the portable phone number includes associating the portable phone number with a routing number unique to the unauthorized mobile communications service provider so that calls made to the customer using the assigned portable phone number are routed to portions of the mobile communications network associated with the unauthorized mobile communications service provider; and where the customer has requested protection from unauthorized porting, sending a message to the customer, wherein the message requests that the customer provide authorization for the request for porting.

29. The computer-readable medium of claim 28, wherein the computer-readable medium is a memory in the system of a mobile communications service provider or a memory in the system of a third party administrator.

30. The computer-readable medium of claim 28, wherein the computer-readable medium is a logical node in a computer network receiving the contents.

31. The computer-readable medium of claim 28, wherein the computer-readable medium is a computer-readable disk.

32. The computer-readable medium of claim 28, wherein the computer-readable medium is a data transmission medium carrying a generated data signal containing the contents.

33. A method for preventing unauthorized switching of mobile communications service providers, the method comprising:

receiving at a mobile communication device, an indication of a portable phone number associated with a first mobile communications service provider for use when calling the mobile communication device; and receiving from a source a message requesting customer authorization for switching from the first mobile service provider to a second mobile service provider, wherein the source is associated with the first mobile communications service provider or a third party administrator, and wherein the source has at least partial control of the switching, and wherein the switching from the first mobile service provider to the second mobile service provider includes creating an association between the second mobile communications service provider and the assigned portable phone number and storing the association in a data store accessed as a result of a call placed by dialing the portable phone number being routed through a switching center to a signal transfer point of the mobile communications network, wherein creating the association between the second mobile communications service provider and the portable phone number includes associating the portable phone number with a routing number unique to the second mobile communications service provider so that calls made to the customer using the assigned portable phone number are routed to portions of the mobile communications network associated with the second mobile communications service provider.

34. The method of claim 33, wherein the received message is a voicemail message.

35. The method of claim 33, wherein the received message is a text message.

36. The method of claim 33, wherein the received message is an email message.

37. The method of claim 33, wherein the received message includes a request for the customer to provide authorization by calling a phone number indicated in the message.

38. The method of claim 33 wherein the received message includes a request for the customer to provide authorization by sending a text message.

* * * * *